Sept. 20, 1949.  C. B. CRANDALL  2,482,155
LOADING CLAMP FOR WARP TYING MACHINES
Filed Nov. 9, 1945
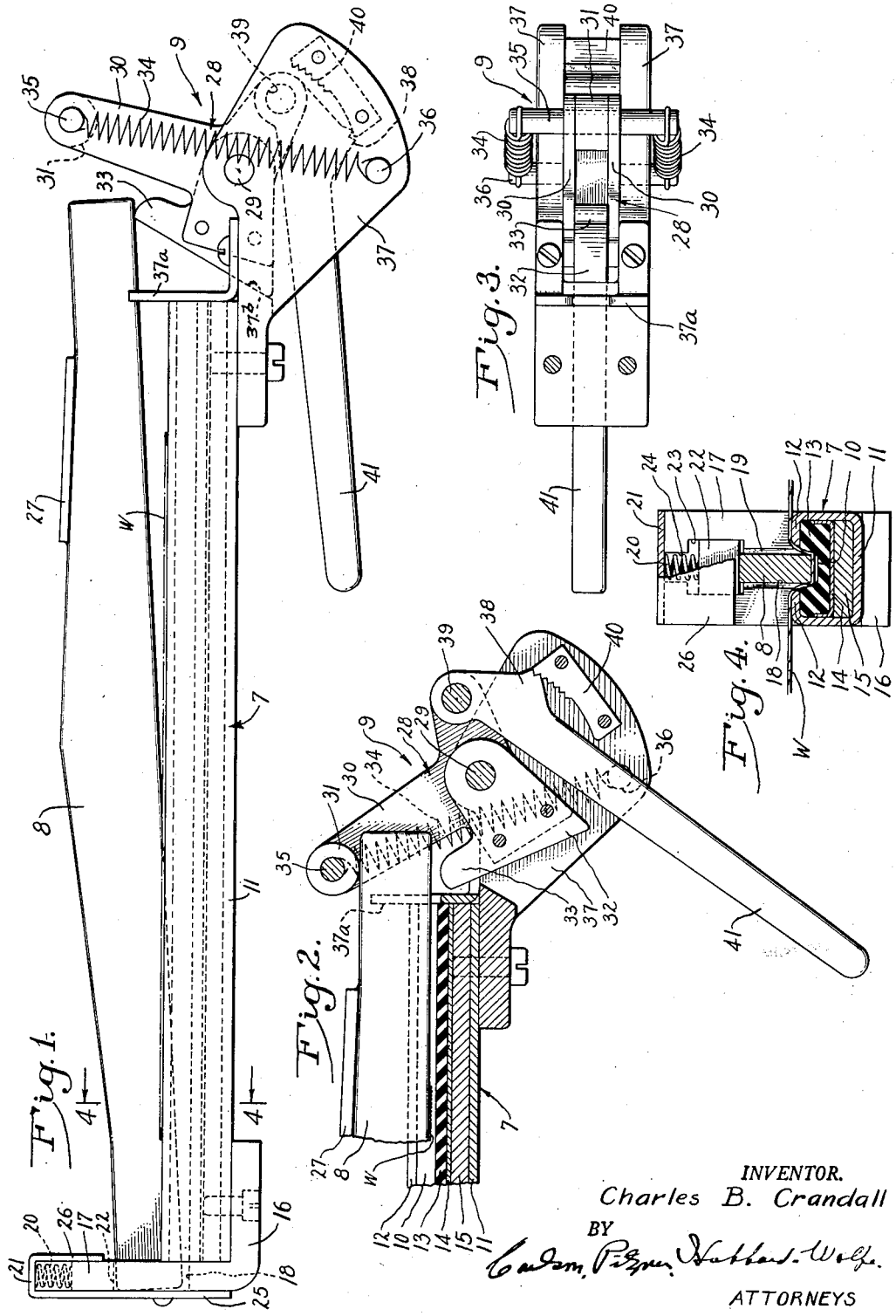
INVENTOR.
Charles B. Crandall
BY
ATTORNEYS Patented Sept. 20, 1949

2,482,155

UNITED STATES PATENT OFFICE 2,482,155

LOADING CLAMP FOR WARP TYING MACHINES

Charles B. Crandall, Rockford, Ill., assignor to Barber-Coleman Company, Rockford, Ill., a corporation of Illinois Application November 9, 1945, Serial No. 627,707

18 Claims. (Cl. 24—264)

1

The invention relates to an improved means for clamping sheets of varying thickness such, for example, as a sheet of warp threads in a warp tying machine. Such machines are adapted for operation upon threads of different sizes and the primary object of the present invention is to provide a clamp which is automatically adjustable to compensate for warps of different thicknesses so as to insure effectual clamping of the individual warp threads notwithstanding variations in thickness of the warp.

Another object is to provide a clamp of the character indicated in which one of two clamping members or bars between which the warp or other material is to be clamped is supported for yielding movement with respect to the other bar so as to accommodate warps of different thicknesses, in combination with means of an advantageous character for locking the movable bar in position with respect to the fixed bar in a manner such as to exert a uniform clamping action on all of the threads of the warp.

Another object is to provide means for locking the movable bar in operative position with respect to the fixed bar, which means is operative automatically as an incident to the exertion of pressure manually upon the movable bar.

Another object is to provide a locking means for the movable bar which is capable of easy and convenient release.

The objects of the invention thus generally set forth, together with other and ancillary advantages, are attained by the construction and arrangement shown by way of illustration in the accompanying drawings, in which:

Figure 1 is a side elevational view of a warp clamp embodying my invention.

Fig. 2 is a fragmentary vertical sectional view through one end of the clamp.

Fig. 3 is a plan view of the clamping means shown in Fig. 2 in detached relation to the clamping bars.

Fig. 4 is a fragmentary transverse sectional view on an enlarged scale taken approximately in the plane of line 4—4 of Fig. 1.

In the illustrative embodiment of my invention herein shown by way of illustration, the improved clamp comprises in general a fixed bar 7 carried by the frame of the warp tying machine and a movable bar 8, one end of which (herein the left end as shown in Fig. 1) is connected with the fixed bar so as to be capable of yielding relative thereto, and the other end of which is adapted to be held in various positions of adjustment relative to the fixed bar, depending upon the

2 thickness of the warp, by a clamping means generally designated 9. In the present instance the bar 8 is positioned above the bar 7 and for convenience these bars will hereinafter be referred to as the upper and lower bars, respectively.

As shown, the lower clamping bar 7 (see Fig. 4) is constructed to provide a groove 10 extending longitudinally of the bar centrally thereof and dimensioned for the reception of the lower edge portion of the upper bar 8 which is made relatively narrow with respect to the bar 7. Herein, the latter is made in the form of a sheet metal channel 11 having upper opposed edge portions 12 with their opposing edges spaced apart a distance somewhat greater than the width of the groove 10. The groove 10 is formed in a strip 13 of rubber or other suitable yielding material carried by an elongated metallic strip 14 having its opposite side edge portions flanged to grip the rubber strip 13. Between the metallic strip 14 and the bottom of the channel 11 is interposed a suitable filler 15.

At one end of the bar 7 is rigidly secured an angular bracket 16 having a vertical leg 17 with a slot 18 therein for receiving one end of the upper bar 8, the slot being dimensioned transversely to correspond substantially to the thickness of the bar 8 and being disposed in alinement with the groove 10. To facilitate insertion of the bar into the slot 18, the edges of the latter may be beveled as indicated at 19.

It will be understood that the upper bar 8 is capable of removal bodily from the bracket 16 and when disposed in the slot 18 is capable of yielding vertically to compensate for warps of different thickness, a warp $w$ being shown clamped in the device as shown in Fig. 4. Vertical yielding movement of the bar 8 relative to the bar 7 is provided for in the present instance by means of a coiled compression spring 20 interposed between a top plate 21 rigid with the bracket and a block 22 vertically slidable in a recess 23 in the bracket, the recess being made somewhat larger than the slot 18 but otherwise forming a continuation thereof. The spring 20 is seated within a bore 24 in the bracket above the recess 23 and is of a strength such as to be capable of exerting a clamping pressure upon the warp sufficient to insure adequate gripping of the warp threads while at the same time permitting a yielding movement of the bar 8 when compensating for the thickness of the warp.

As herein shown, the plate 21 forms a part of a generally hook-shaped member having a vertical leg 25 rigidly secured to the outer face of the bracket 16, the terminal portion 26 being in opposed parallel relation to the leg portion 25. It will be observed that the vertical leg 25 of this member serves to close the end of the slot 18.

When a warp has been placed upon the lower bar 7 with the threads thereof properly arranged, the upper bar 8 is placed in position with its one end inserted in the slot 18, it being observed that this slot extends downwardly at least to the bottom of the groove 10. The operator then places pressure on the upper bar through the medium of a pad 27 disposed adjacent the end of the bar remote from the bracket 16, and in such downward movement forces the upper bar into clamping engagement with the warp, and as an incident thereto actuates the clamping device 9.

As best shown in Fig. 2, the clamping device 9 comprises, in the present illustrative embodiment a locking yoke 28 pivoted at 29 and comprising a pair of laterally spaced arms 30 carrying a roller 31 at their free ends, the yoke being swingable from a normal inactive position (Fig. 1) into an operative position in which the roller overlies the extreme end of the bar. Rigid with and interposed between the arms 30 of the yoke is a plate 32 having a finger 33 providing a bearing or rest for the extreme end of the bar when the clamping device is in its inoperative position as shown in Fig. 1. The yoke 28 and the finger 33 rigid therewith are normally held in the position shown in Fig. 1 by a coiled contractile spring 34 connecting the roller stud 35 at the free end of the arms 30 with an anchoring stud 36 on a bifurcated bracket 37 secured to the lower bar 7 and supporting the pivot stud 29 for the yoke 28. Movement of the yoke by the spring is limited by the engagement of the plate with a stop surface 37b on the bracket 37. Upon depression of the bar 8 in the clamping operation the finger 33 is pressed downwardly, swinging the yoke 28 against the action of the spring 34. When the spring passes over center with respect to the pivot pin 29, it imparts a swinging movement to the yoke so as to carry the roller 31 into overlying relation to the end of the bar 7. To guide the bar 8 in its downward movement, a slotted plate 37a is secured to the bracket 37 in abutting relation to the adjacent end of the lower bar 7.

Means is provided for locking the yoke and thereby the bar 8 in its clamping position and preferably this means is of a character such as to engage automatically. In the present instance the locking means comprises a dog or pawl 38 pivotally supported on a stud 39 carried by the yoke 28 and coacting with a toothed locking member or ratchet 40 interposed between the portions of the bifurcated bracket 37 and rigidly secured thereto. The pawl has a depending arm or hand lever 41 of such weight as to cause the pawl to move along the ratchet member 40 a distance depending upon the thickness of the warp being clamped, positively locking the yoke 28 against movement, and holding the roller 31 downwardly against the clamping bar. To release the clamp the hand lever 41 is swung upwardly to disengage the pawl from the locking ratchet, and as the upward movement of the lever is continued the lever engages with the plate 32 so as to lift the upper clamping bar upwardly, disengaging it from the groove 10, and also to carry the yoke and its roller 31 into disengaged relation with respect to the upper clamping bar as shown in Fig. 1. As the spring 34 moves reversely over center it becomes effective to hold the yoke with the finger 33 in supporting relation to the upper clamping bar.

I claim as my invention:

1. A warp clamp comprising fixed and movable clamping bars between which a warp is to be clamped, means connecting said bars at one end for relative swinging movement and adapted to permit the movable bar to yield with respect to the fixed bar according to the thickness of the warp, and means disengageably connecting the other ends of the two bars with the warp clamped therebetween, comprising a member pivotally supported with respect to the fixed bar and having a part engageable with the movable bar, spring means acting to hold said member in disengaged relation to the movable bar, and a locking device for holding the member in various positions of adjustment with said part in holding relation to the movable bar.

2. A warp clamp comprising fixed and movable clamping bars between which a warp is to be clamped, means connecting said bars at one end for relative swinging movement and adapted to permit the movable bar to yield with respect to the fixed bar according to the thickness of the warp, and means disengageably connecting the other ends of the two bars with the warp clamped therebetween including a pivotal locking member mounted on the fixed bar and having a part engageable with the movable bar, and a ratchet device for locking the pivotal member positively in various positions of adjustment as determined by the extent of movement of the movable bar toward the fixed bar.

3. A warp clamp comprising fixed and movable clamping bars between which a warp is to be clamped, means connecting said bars at one end for relative swinging movement and adapted to permit the movable bar to yield with respect to the fixed bar according to the thickness of the warp, and means disengageably connecting the other ends of the two bars with the warp clamped therebetween, comprising a member pivotally supported with respect to the fixed bar and having a part engageable with the movable bar, spring means acting to hold said member in disengaged relation to the movable bar, and a locking device for holding the member in various positions of adjustment with said part in holding relation to the movable bar, said spring means acting upon said pivotal member to render said locking device effective in its various positions.

4. A warp clamp comprising fixed and movable clamping bars between which a warp is to be clamped, means connecting said bars at one end for relative swinging movement and adapted to permit the movable bar to yield with respect to the fixed bar according to the thickness of the warp, and means disengageably connecting the other ends of the two bars with the warp clamped therebetween, comprising a member pivotally supported with respect to the fixed bar and having a part engageable by the movable bar whereby to swing said member as the movable bar is moved into clamping engagement with the warp, said member having another part engageable with the bar in such movement, a spring yieldably urging such other part into engagement with the bar, and a ratchet device operative as an incident to the movement of said member by said spring for positively locking the member and thereby the movable bar in clamping relation to the movable bar.

5. A warp clamp comprising, in combination, a pair of clamping bars between which the warp is to be clamped, means yieldably connecting said bars at one end for relative movement toward and from each other, and means positively holding the bars at their opposite ends in clamped relation including a pivotal member engageable with the movable bar, and a spring normally holding said member in disengaged position with respect to said movable bar, said member having a part engageable by the movable bar to swing said member into holding relation thereto.

6. A warp clamp comprising, in combination, a pair of clamping bars between which the warp is to be clamped, means yieldably connecting said bars for relative movement toward and from each other, and means for positively holding the bars at their opposite ends in clamped relation including a pivotal member, a spring normally holding said member in disengaged position with respect to said movable bar, said member having a part engageable by the bar to swing said member into holding relation to the movable bar, and means operative automatically as an incident to the movement of said member to lock it against reverse movement.

7. A clamp for warps and the like comprising, in combination, fixed and movable clamping bars, means at one end of the fixed bar pivotally connecting it to the movable bar, said bars being adapted to receive between them a warp to be clamped, a member pivotally supported at the other end of the fixed bar and swingable into and out of engagement with the movable bar, and a locking device for said member operative as an incident to the movement of the movable bar into clamping position with respect to the fixed bar.

8. A clamp for warps and the like comprising a fixed clamping bar and a movable clamping bar, means connecting said bars at one end thereof for relative movement, a holding member mounted at the other end of the fixed bar and movable into holding engagement with the movable bar, a locking device operative as an incident to the movement of said member into its holding position to retain it in such position, said locking device being releasable to permit return movement of the member into disengaged relation to the movable bar.

9. A warp clamp comprising, in combination, fixed and movable clamping bars between which a warp is to be clamped, means connecting said bars at one end for relative swinging movement and adapted to permit the movable bar to yield with respect to the fixed bar according to the thickness of the warp, and means disengageably connecting the other ends of the two bars with the warp clamped therebetween comprising a member pivotally supported with respect to the fixed bar and having a part engageable with the movable bar, spring means normally acting to hold said member in disengaged relation to the movable bar, and a locking device responsive to the movement of said member into holding engagement with the movable bar and acting to hold said member against reverse movement.

10. A warp clamp comprising, in combination, fixed and movable clamping bars between which a warp is to be clamped, means connecting said bars at one end for relative swinging movement and adapted to permit the movable bar to yield with respect to the fixed bar according to the thickness of the warp, and means disengageably connecting the other ends of the two bars with the warp clamped therebetween, comprising a support rigid with the fixed bar, a holding member pivoted on said support and having a part engageable by the movable bar, means including an over center spring acting in one position to hold said member in disengaged relation to the movable bar and in another position to impart swinging movement to said member, and a locking device comprising a ratchet member fixed to said support and a pawl carried by the pivotal member and engageable with said ratchet member.

11. A warp clamp comprising, in combination, fixed and movable clamping bars between which a warp is to be clamped, means connecting said bars at one end for relative swinging movement and adapted to permit the movable bar to yield with respect to the fixed bar according to the thickness of the warp, and means disengageably connecting the other ends of the two bars with the warp clamped therebetween, comprising a support rigid with the fixed bar, a holding member pivoted on said support and having a part engageable by the movable bar, means including an over center spring acting in one position to hold said member in disengaged relation to the movable bar and in another position to impart swinging movement to said member, and a locking device comprising a ratchet member fixed to said support and a pawl carried by the pivotal member and engageable with said ratchet member, said pawl yieldably engaging with the ratchet member and being manually operable in disengageable relation thereto.

12. In a clamp for warps and the like having a fixed clamping bar and a movable clamping bar, means releasably clamping said bars together at one end including a support rigid with the fixed bar, a member pivoted on said support and having a part engageable by the movable bar in the movement of the latter toward the fixed bar whereby to impart a swinging movement to the member, said member having another part operative in such movement of the member into holding engagement with the movable bar, a spring connecting said member with said support and movable therewith from a position at one side of the pivotal axis of the member to the other side thereof, a pawl carried by said member, and a ratchet member carried by said support and engageable by said pawl in the movement of the member by said spring as the latter moves in over center relation to its pivotal axis.

13. In a clamp for warps and the like having a fixed lower clamping bar and a movable upper clamping bar, a support rigid with respect to the lower bar, a member pivoted on said support to turn on a horizontal axis and arranged for movement by the upper bar in its approach toward the lower bar, a ratchet member carried by said support, and a gravity actuated pawl pivoted to the member and engageable with said ratchet as an incident to the movement of the member with the movable bar.

14. In a clamp for warps and the like having a fixed lower clamping bar and a movable upper clamping bar, a support rigid with respect to the lower bar, a member pivoted on said support to turn on a horizontal axis and having a part engageable with the upper surface of the movable bar and another part engageable with the lower surface of the movable bar, a ratchet member carried by said support and a pawl pivoted to the member and engageable with said ratchet as an incident to the movement of the member into holding relation to the movable bar, said pawl having a hand lever providing a depending weight for effecting the movement of the pawl in its movement along the ratchet member.

15. In a clamp for warps and the like having a fixed bar and a movable bar, a clamping device for holding said bars in various positions of adjustment relative to each other including a movable clamping element and a support therefor, a part on said support, and a gravity actuated member coacting with said part to render said clamping device effective in the various positions of adjustment of the movable bar.

16. In a clamp for warps and the like having a lower fixed bar and a movable upper bar, a clamping element mounted on the fixed bar for movement into and out of engagement with the movable bar, means operative in response to the movement of the movable bar toward the fixed bar to carry said clamping element into engagement with the fixed bar, and means effective in such movement of the clamping element to hold it against reverse movement.

17. In a clamp for warps and the like having a fixed bar and a movable bar, a clamping device for holding said bars in various positions of adjustment relative to each other, and means operative automatically as an incident to the movement of the movable bar toward the fixed bar to lock said device in holding relation to the movable bar, said means including a pivoted holding member, a spring operative upon movement of said member into holding engagement with the movable bar to impart a swinging movement to the member, and a ratchet device rendered effective in such movement of the member to hold it against reverse movement.

18. In a clamp for warps and the like having a lower fixed bar and an upper movable bar, a clamping device for holding said bars in various positions of adjustment relative to each other, and means operative automatically as an incident to the depression of the movable bar toward the fixed bar to lock said device in holding relation to the movable bar, said means including a pivoted holding member, a spring operative upon movement of said member into holding engagement with the movable bar to impart a swinging movement to the member, and a ratchet device rendered effective in such movement of the member including a pawl pivoted to said member, a stationary ratchet member engageable by the pawl, and a hand lever for reversely swinging said pawl out of engagement with the ratchet member, said hand lever being engageable with the holding member in such reverse movement to carry the holding member into disengaged relation with the movable clamping bar.

CHARLES B. CRANDALL.

REFERENCES CITED

The following references are of record in the file of this patent:

UNITED STATES PATENTS

| Number | Name | Date |
| --- | --- | --- |
| 690,837 | Conzett | Jan. 7, 1902 |
| 845,344 | Gallinger | Feb. 26, 1907 |
| 1,579,227 | Mangum | Apr. 6, 1926 |
| 1,987,159 | Rasmussen | Jan. 8, 1935 |